June 6, 1967 H. M. TEAGER 3,324,285

METHOD OF AND APPARATUS FOR GENERATING SYNCHRONIZATION FROM A SPATIAL DISTRIBUTION OF SIGNALS

Filed July 15, 1963

INVENTOR.
HERBERT M. TEAGER
BY Rines and Rines
ATTORNEYS

United States Patent Office 3,324,285
Patented June 6, 1967

3,324,285

METHOD OF AND APPARATUS FOR GENERATING SYNCHRONIZATION FROM A SPATIAL DISTRIBUTION OF SIGNALS

Herbert M. Teager, Belmont, Mass., assignor to Lan Jen Chu, Littleton, Mass.
Filed July 15, 1963, Ser. No. 294,854
11 Claims. (Cl. 235—61.11)

The present invention relates to methods of and apparatus for generating synchronizing impulses from a spatial distribution of signals; and, more particularly, to producing sampling impulses that distinguish individual similar adjacent signals.

There are numerous instances where distributions of signals are monitored and it is desired to indicate each successive signal separately, as for the purpose of producing a sampling synchronizing, flashing, counting or other impulse (all hereinafter referred to generically as synchronizing signals or impulses) corresponding to each successive signal. In binary signal systems embodying distributions of "1" and "0" signals, for example, two or more successive "1" signals may occur without break, and must be distinguished from a single "1" signal or a different number of successive "1" signals. As an illustration, in vehicle-identifying systems involving the reflection of electromagnetic energy, such as visible or invisible light waves or microwaves, from a coded reflecting surface or tag, signals corresponding to "0" and "1" signals will be successively returned to a detector station as the reflecting surface or tag carried by the vehicle moves past an electromagnetic-wave transmitting-and-receiving station. If pulsed energy is used to "illuminate" the tag, a pulse of energy must be transmitted for each successive coded element or portion of the tag, such as slots or other energy-absorbing or energy-differentiating mechanisms. Since the vehicle may travel at different speeds or velocities, however, the pulsing rate must be synchronized with the passing of successive code elements or portions of the tag. While this may be effected by separately determining the velocity of the vehicle and controlling the pulsing rate in accordance therewith, this is relatively complicated and requires velocity-determining apparatus. If continuous-wave energy is employed, moreover, it is also necessary to distinguish the signal received from a plurality of adjacent code slots, for example, providing a "1" signal, from a single slot or different number of adjacent code slots producing a "1" signal.

It is to the solution of the problem of providing synchronization impulses from the received distribution of signals themselves, substantially independently of the velocity of the vehicle, that the present invention is primarily directed; the invention obviating the necessity for velocity-determining apparatus and inherently distinguished successive code-element signals.

A further object of the invention is to provide a new and improved electromagentic-wave detecting apparatus.

Another object is to provide a new and improved method of and apparatus for distinguishing signals in a signal distribution, that is of more generally utility than the illustrative important application to vehicle identification or the like.

An additional object is to provide a novel signal synchronizing apparatus.

Still a further object is to provide such an apparatus that derives synchronization from a spatial distribution of light signals.

Other and further objects will be explained hereinafter and will be more particularly pointed out in the appended claims. In summary, however, from one of its broad aspects, the invention relates to a method of and apparatus for producing a plurality of successive substantially equal-width signals, applying the signals successively to a plurality of signal-receiving regions successively separated a distance slightly greater than the said width, combining the received signals, differentiating the combined received signals to provide a plurality of impulses corresponding to the termination of the reception of certain signals at certain of the said regions, producing a cumulative signal corresponding to the plurality of successive signals, and sampling the cumulative signal by the said impulses to produce pulse outputs representative of the successive signals.

The invention will now be described in connection with the accompanying drawings, FIG. 1 of which is a perspective view of a preferred embodiment thereof operating in accordance with the novel method underlying the same;

Figure 1:
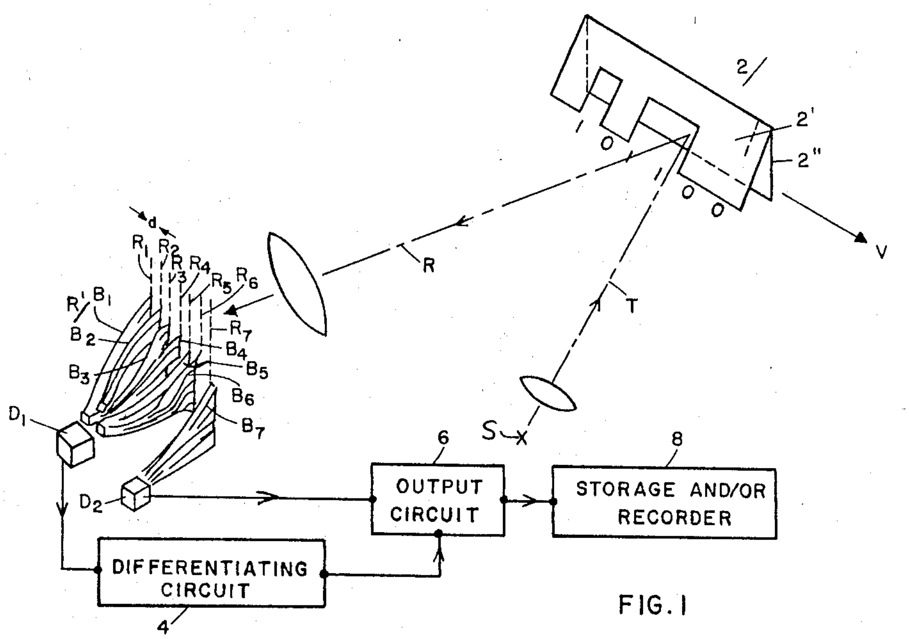
Figure 2A:
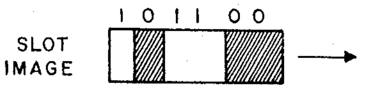
FIG. 2A is a diagrammatic view of a reflected image pattern.

Referring to FIG. 1, the invention is shown, for illustrative purposes, applied to the vehicle-identification problem before discussed, in accordance with which a coded identification tag 2 is carried by the vehicle, in the direction of the arrow V, past an electromagnetic-energy transmitting-and-receiving station. While numerous types of tags may be used, as before explained, a preferred tag is illustrated comprising a front slotted surface 2′ and a rear reflecting surface 2″ angularly extending therefrom. The tag surface 2′ is binary coded with a left-most slot of predetermined width or space representing a "1," an adjacent solid region "0" of the same width; a double-width slot representing two successive "1" slots labelled "11"; and a right-most double-width solid region representing two successive "0" elements, labelled "00." Electromagnetic energy is focused from a source S along a path T upon the rear surface 2″ of the passing tag 2, and is reflected along path R from the rear surface 2″ of the tag 2 only in the regions of the slots in the front surface 2′. Thus the slot image of FIG. 2A is focused upon the receiving station, generically designated at R′. With light-wave electromagnetic energy, an "on" light signal is produced at "1" in FIG. 2A, an "off" signal or shadow at "0," a double-width "on" light signal at "11," and a double-width "off" or shadow at "00."

This image, in accordance with the invention, is focused upon a plurality of successively laterally displaced regions $R_1$, $R_2$, $R_3$, $R_4$, $R_5$ and $R_6$, each separated a distance $d$ preferably just slightly greater than the width or space of the signals "1" and "0" of the light image of FIG. 2A, for a reason later made evident. At the regions $R_1$ through $R_6$, light-wave paths are provided by respective bundles $B_1$ through $B_6$ of vertically converging light-wave conductors, such as glass or appropriate well-known light-conducting fibers or conduits, shaped or bent inwardly to feed the signals received successively at regions $R_1$ through $R_6$ to a common light-to-electric energy transducer $D_1$, such as a photocell or other light-responsive detector device.

Figure 2B:
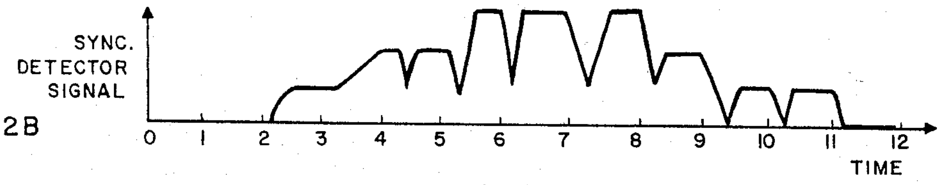
FIG. 2B is a graph plotting the signal, as a function of time, detected in the image pattern.
Figure 2C:
FIG. 2C is a similar graph of signals representing the differentiation of the signals plotted in FIG. 2B.

The combined successively received signals at detector $D_1$, as the image of this FIG. 2A scans or passes the successive bundles $B_1$ through $B_6$ at regions $R_1$ through $R_6$, is plotted in FIG. 2B. In view of the before-mentioned preferred distance $d$, as each light-image signal "1" passes beyond a bundle $B_1$ through $B_6$, the reception of signal in that bundle terminates, producing the downward pulses shown in FIG. 2B; as between abscissa time units 4 and 5, 5 and 6, etc. This detected signal is differentiated in a conventional differentiation circuit 4, FIG. 1, producing the output shown in FIG. 2C, wherein each of the downward pulses of FIG. 2B produces a narrower negative or downward pulse in FIG. 2C.

Figure 2D:
FIG. 2D is the composite output of the detected image pattern.
Figure 2E:
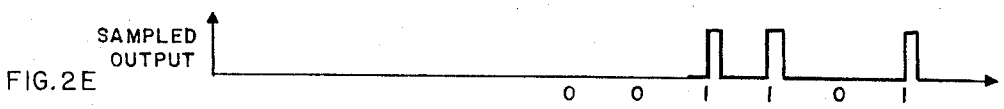
FIG. 2E is the differentiation-signal-sample output of the composite signal of FIG. 2D.

After the image of FIG. 2A has scanned or passed the bundles $B_1$ through $B_6$, a further thicker bundle of light-wave conductors $B_7$, at region $R_7$, receives and feeds to a further detector $D_2$ the composite signal of the image of FIG. 2A and produces a cumulative signal corresponding to the plurality of successive signal portions of the said image, as represented by the graph of FIG. 2D. By feeding negative or downward differentiation pulses of FIG. 2C to this cumulative signal, in the output circuit 6 of FIG. 1, the cumulative signal is time-sampled to produce the sample pulse output of FIG. 2E. This pulse output of FIG. 2E will be recognized as identically representative of the successive binary signals "00," "11," "0," "1" of the tag and image thereof. The code of the tag 2 may thus be stored and/or recorded at 8, as is well-known.

Thus, in accordance with the invention, a self-synchronization has been attained for sampling the signals without the necessity for separately determining the vehicle velocity; each "1" signal being individually determined, moreover, even if contiguous with other "1" signals. While the apparatus disclosed is particularly useful for obtaining synchronization from a spatial distribution of light signals, clearly, as before stated, other types of signals may be employed and the benefits of the invention may obviously be attained with a wide variety of different types of apparatus. Further modifications will also occur to those skilled in the art and all such are considered to fall within the spirit and scope of the invention as defined in the appended claims.

What is claimed is:

1. Signal apparatus having, in combination, means for producing a plurality of successive substantially equal-width signals, a plurality of signal-receivers disposed at regions successively displaced slightly greater than the said width, means for applying the signals successively to the said receivers, means for combining the received signals, differentiating means connected to the receivers to differentiate the combined received signals to provide a plurality of impulses corresponding to the termination of the reception of certain signals at certain of the said regions, means for producing a cumulative signal corresponding to the plurality of successive signals, and means for connecting the differentiating means to the cumulative-signal-producing means to sample the cumulative signal by the said impulses to produce pulse outputs representative of the successive signals.

2. Apparatus as claimed in claim 1 and in which the said signals are binary-coded signals.

3. Apparatus as claimed in claim 1 and in which the signal-applying means comprises means for scanning the said signals past the said regions.

4. Apparatus as claimed in claim 1 and in which the receivers comprise means for conducting the signals along separate paths corresponding to each of the said regions to a common reception region.

5. Apparatus as claimed in claim 4 and in which the signal-producing means comprises coded reflector means having different reflecting properties, and means for reflecting electromagnetic waves from the reflector means to produce coded reflected signals.

6. Apparatus as claimed in claim 4 and in which the signal conducting means comprises bundles of light-wave conductors.

7. Apparatus as claimed in claim 6 and in which the bundles of light-wave conductors corresponding to the separate receivers are converged to the said common reception region.

8. Apparatus as claimed in claim 1 and in which the said signals are electromagnetic-wave signals.

9. Apparatus as claimed in claim 8 and in which each of the plurality of receivers comprises electromagnetic-wave conductor means for conducting the signals along separate paths to a common reception region.

10. Apparatus as claimed in claim 9 and in which the cumulative-signal-producing means comprises a further receiver.

11. Apparatus as claimed in claim 10 and in which the further receiver comprises electromagnetic-wave conductor means.

References Cited

UNITED STATES PATENTS

| | | | |
|---|---|---|---|
| 3,158,748 | 11/1964 | Laycak et al. | 250—219 |
| 3,165,730 | 1/1965 | Robinson | 340—347 |

OTHER REFERENCES

Pages 20–21, December 1961, A. C. Thorpe, Optical Scanner, IBM Technical Bulletin Disclosure, vol. 4, No. 7.

DARYL W. COOK, *Acting Primary Examiner.*

MAYNARD R. WILBUR, *Examiner.*

A. L. NEWMAN, *Assistant Examiner.*